(12) United States Patent
Aida et al.

(10) Patent No.: US 6,970,204 B1
(45) Date of Patent: Nov. 29, 2005

(54) IMAGE MAGNIFYING CIRCUIT

(75) Inventors: Toru Aida, Kanagawa-ken (JP);
Hideyuki Ohmori, Kanagawa-ken (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 09/831,461

(22) PCT Filed: Nov. 2, 1999

(86) PCT No.: PCT/JP99/06124

§ 371 (c)(1),
(2), (4) Date: May 8, 2001

(87) PCT Pub. No.: WO00/28519

PCT Pub. Date: May 18, 2000

(30)   Foreign Application Priority Data

Nov. 10, 1998   (JP)  ................................ 10/319641

(51) Int. Cl.[7] ............................................ H04N 11/00
(52) U.S. Cl. ..................................... 348/441; 348/445
(58) Field of Search ................................ 348/445, 448, 348/556, 581, 558, 553, 913, 441, 443–449, 348/561

(56)   References Cited

U.S. PATENT DOCUMENTS

| | | | | |
|---|---|---|---|---|
| 5,323,235 A | * | 6/1994 | Tonomura et al. ........... | 348/445 |
| 5,386,236 A | * | 1/1995 | Hong .......................... | 348/445 |
| 5,793,434 A | * | 8/1998 | Lee ............................. | 348/445 |
| 5,856,849 A | * | 1/1999 | Aihara ........................ | 348/445 |
| 6,097,438 A | * | 8/2000 | Nagakubo et al. .......... | 348/445 |
| 6,115,072 A | * | 9/2000 | Vuong et al. ................ | 348/445 |
| 6,144,412 A | * | 11/2000 | Hirano et al. ............... | 348/441 |
| 6,191,820 B1 | * | 2/2001 | Kang et al. .................. | 348/445 |
| 6,229,574 B1 | * | 5/2001 | Han .......................... | 348/555 |
| 6,404,458 B1 | * | 6/2002 | Kang .......................... | 348/445 |
| 6,618,091 B1 | * | 9/2003 | Tamura ...................... | 348/363 |
| 6,714,210 B1 | * | 3/2004 | Yip et al. .................... | 345/667 |

* cited by examiner

Primary Examiner—John Miller
Assistant Examiner—Paulos M. Natnael
(74) Attorney, Agent, or Firm—Flynn, Thiel, Boutell & Tanis, P.C.

(57)   ABSTRACT

An image magnifying circuit is made up of a frame memory 12 for storing input image data, a coefficient memory 18 in which filter coefficients corresponding to a plurality of magnification ratios are stored, a non-linear magnification controller 20 for outputting an enable signal for reading the corresponding image data from the frame memory 12 and a coefficient selecting address AD3 for reading the corresponding filter coefficient from the coefficient memory 18, on the basis of an area width w predetermined to divide a display screen into n parts and a predetermined magnification for the n parts, and a filter 14 for filtering the image data from the frame memory 12 on the basis of the filter coefficients from the coefficient memory 18 to output the image data on the image which is non-linearly magnified in a horizontal direction. These filter coefficients correspond to the magnification ratio which are set for the n parts of the display screen.

6 Claims, 4 Drawing Sheets

IMAGE MAGNIFYING CIRCUIT

TECHNICAL FIELD

The present invention is designed to enlarge a picture having the normal aspect ratio of 4:3 to a picture having the aspect ratio of 16:9 for display on a display panel for a wide picture and relates to an input sampling image data processing circuit for enlarging the picture in the horizontal direction.

The display panel may be, for instance, a PDP (Plasma Display Panel).

BACKGROUND ART

Recently, wide television sets having an aspect ratio of 16:9 and image display sets with PDP are increasing in number. In order for an image source having the aspect ratio of 4:3 to be fully displayed (in full mode display), it is necessary to provide an image magnifying circuit designed to extend the original image source in the horizontal direction.

With a conventional image magnifying circuit, the input image data is enlarged in the horizontal direction at a certain magnification or the magnification rate is set so that it gradually increases towards both ends in the horizontal direction.

However, with the conventional method, in which the input image data is enlarged in the horizontal direction at a certain magnification, the original image is enlarged only in the horizontal direction at a certain magnification, so that it is not possible to enlarge different areas (e.g. the image divided into n number of areas) of an image at different magnifications respectively, thereby restricting the flexibility in producing various image effects, the n being 2 or any one of larger integers.

Further, the conventional method is designed only to process the input image data so that the nearer towards both ends in the horizontal direction, the greater the magnification in the horizontal direction, and so it is not possible to enlarge different areas of the image, resulting from dividing an image into n number of areas, at different magnifications, thereby restricting the freedom of producing various image effects.

The present invention was made in consideration of the above-mentioned problems of the conventional method and intended for providing an image magnifying circuit capable of magnifying the different areas divided into n number of an image at different magnifications in the horizontal direction so that various image effects can be obtained.

For instance, the present invention is intended for producing various image effects such as a panoramic-view effect from a given image by enabling the different areas of a picture, divided into n number of areas, to be enlarged at gradually increasing magnifications towards both horizontal ends, or a fisheye-view image effect by enabling different areas of a picture, divided into n portions, to be reduced at a gradually increasing reduction rate towards both horizontal ends.

DISCLOSURE OF THE INVENTION

The image magnifying circuit according to the present invention, designed for processing the input sampling image data so that the image to be displayed is enlarged in the horizontal direction, comprises an image memory for storing the input image data, a coefficient memory for storing the predetermined filter coefficients corresponding to a plurality of magnifications, a non-linear magnification controller for not only outputting an enable signal for reading out the image data corresponding to the subject image from the image memory according to any magnification set for each of the n number of areas, each having a width, w, by which the image is divided into the n number of equal areas but also for outputting the coefficient selection address for reading out the corresponding filter coefficient from the coefficient memory, and a filter not only for filtering the image data read out from the image memory according to the filter coefficient read out from the coefficient memory but also for outputting the image data, which has undergone non-linear magnification processing in horizontal direction. Here, w represents a set numerical value.

In the above composition, when the non-linear magnification controller out puts the enable signal and the coefficient selection address, not only the corresponding image data is read out from the image memory but also the corresponding filter coefficient is read out from the coefficient memory. Then, the filter filters the image data according to the filtering coefficient to output image data which has undergone the non-linear magnification processing in the horizontal direction. In this case, since the filter coefficient read out from the coefficient memory corresponds to the magnification set for each of the areas, provided by dividing the whole display area into n number of areas each having the width, w, each of the n number of areas can be enlarged in the horizontal direction at any magnification to produce various image effects. For instance, the image effect such as panoramic-view effect and fisheye-view effect can be displayed.

It can be made easy to alter the magnification set for each of the areas, provided by dividing the display area into n number of equal areas having a width, w, respectively by making the coefficient memory comprise a coefficient ROM storing the predetermined filter coefficients corresponding to a plurality of magnifying powers, a memory controller for not only reading out the filter coefficient from the coefficient ROM according to the transfer start signal but also for outputting the coefficient writing address and R/W selection signal, a selector for selectively outputting the coefficient selection address to be outputted from the non-linear magnification controller or the coefficient writing address to be outputted from the memory controller according to the R/W selection signal to be outputted from the memory controller, and a coefficient RAM for storing the filter coefficient, which is read out from the coefficient ROM according to the coefficient writing address outputted from the selector when the R/W selection signal outputted from the memory controller is a signal for selecting W, and for reading out the filter coefficient according to the coefficient selection address, which is outputted from the selector when the R/W selection signal is the signal for selecting R.

In the above description, the ROM stands for the Read Only Memory; R/W stands for Read/Write; RAM stands for the Random Access Memory.

The composition of the non-linear magnification controller can be simplified by making it comprise an area selection signal generator for generating an area selection signal for sequentially selecting the n number of areas according to the set area width, w, a first selector outputting a magnification parameter, m, set for each corresponding area according to the area selection signal generated by the area selection signal generator, an n-bit adder for receiving, as an input, the magnification parameter m selected by the first selector, an address offset arithmetic-logic unit for determining the start point of the coefficient selection address according to the input of the magnification parameter m set for the selection start area out of the n number of areas, a second selector for selectively outputting the calculated value of the address offset arithmetic-logic unit or the sum obtained by the adder depending on the presence or absence of an initializing signal, a first delay circuit for not only delaying the output value of the second selector by one sampling period to output it as a coefficient selection address but also for receiving it as another input value to the adder, an arithmetic-logic circuit for outputting the carry signal of the adder and the logical sum of the initializing signal, and a second delay circuit for delaying the output signal of the logical sum circuit by one sampling period to output it as an enable signal of the image memory. In this case, m represents a positive number of $2^n$ or less, while $2^n$ represents the n-th power of 2, and $2^n/m$ is equivalent to the magnification.

The composition of the area selection signal generator can be simplified by making it comprise a load terminal L1 for loading the initializing signal as a numeric value 1, a dot counter for counting the dot clock, a coincidence detection circuit for comparing the counted value of the dot counter with 1 or 2 times the set area width w to confirm that they coincide with each other for output, as a counted value 1, to the load terminal L1, an up/down counter, which is to be reset by the initializing signal, for counting the dot clock according to the enable signal detected from the coincidence circuit to output the counted value as the area selection signal, an up/down controller for controlling the up/down counter to the up-count mode by outputting the H-level signal when the counted value of the up/down counter has become 0, while controlling the up/down counter to the down-count mode according to the signal detected from the coincidence detection circuit after the counted value K of the up/down counter has changed to a value coinciding with the value corresponding to the central area of the image to be displayed, and an area width controller for outputting the set area width w, as a value for comparison, to the coincidence detection circuit in the initial state, while outputting, as a value for comparison, a value equivalent to 2 times the set area width to the coincidence detection circuit when the counted value K of the up/down counter has changed to the value corresponding to the central area of the image to be displayed.

Not only the memory capacity required for the coefficient memory can be reduced but also the composition of the selector of the non-linear magnification controller can be simplified when the magnification parameter m to be set for the n number of areas are set so that the values are distributed symmetrically with respect to the central area of the picture to be displayed.

A panoramic picture, in which the magnification increases gradually towards the left end and the right end, can be obtained when the magnification parameters m set for the n number of the areas are distributed symmetrically with respect to the central area of the picture to be displayed, while decreasing the magnification towards the left end and the right end of the picture from the center area of the picture to be displayed.

A fisheye-view picture, in which the magnification decreases gradually towards the left end and the right end, can be obtained when the magnification parameters m set for the n number of areas are distributed symmetrically with respect to the central area of the picture to be displayed, while decreasing the magnification gradually towards the leftmost and the rightmost areas from the central area of the picture to be displayed.

BEST MODE FOR CARRYING OUT THE INVENTION

The embodiments of the present invention will be described hereunder referring to the related drawings.

For convenience of explanation, assume that the input image data is of 8 bit; the image to be displayed having an aspect ratio of 16:9 is divided into 16 equal areas (case where n=16) by an area width w; the magnification parameter m, whose value can be set to any value depending on the divided areas of the image, is set to m0 through m7 for the areas ranging from the leftmost area 0 to the central area 7, while setting the same to 7m through 0 for the areas ranging from the central area 8 to the rightmost area 15 so that the magnification parameters can be distributed symmetrically with respect to the central area of the image to be displayed. The magnification parameter m relates to the magnifying power, that is, 256/m is equivalent to the magnifying power. That is, the magnification parameters m0 through m7 are the values relating to the magnifying power data.

Figure 1:
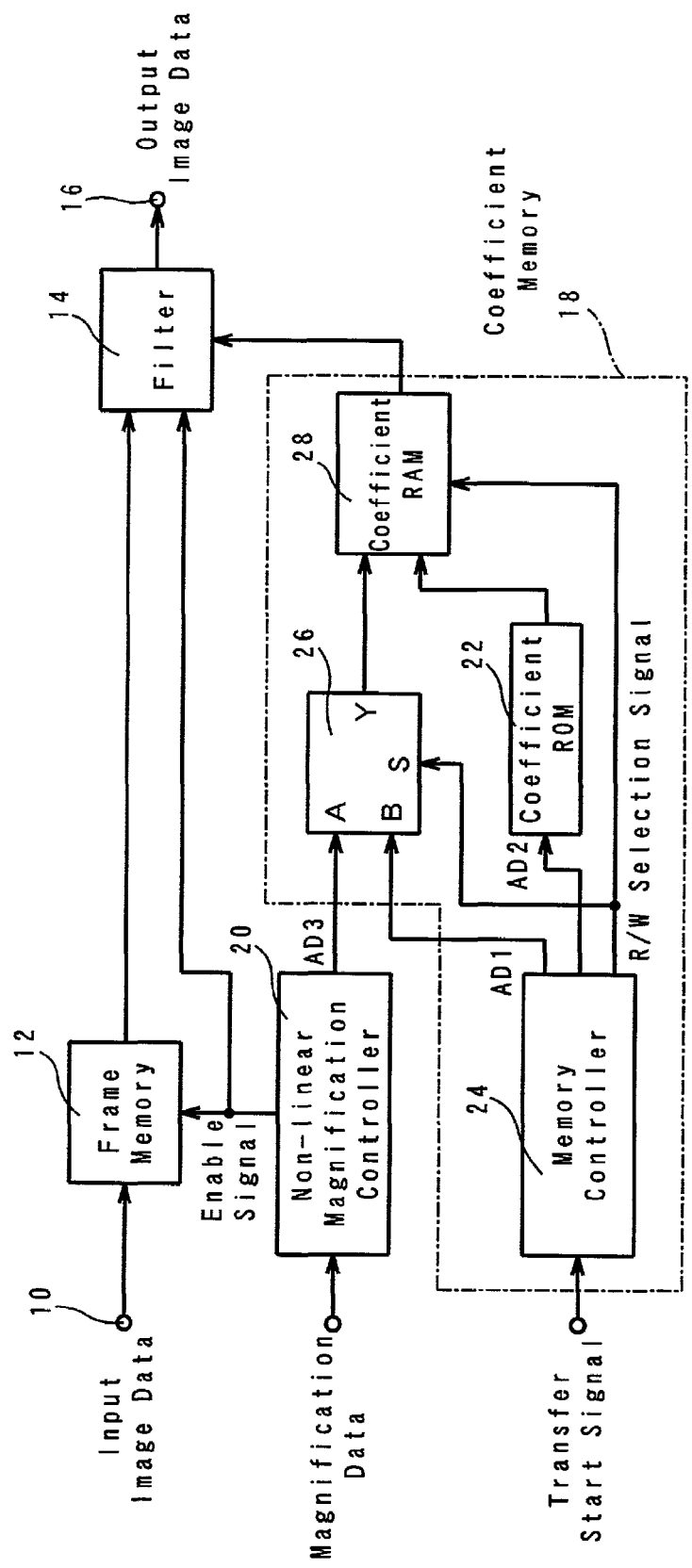
FIG. 1 is a block diagram showing an image magnifying circuit as an embodiment of the present invention.

In FIG. 1, 10 represents the input terminal whereto the image data sampled by the sampling frequency Fs and 12, a frame memory as an example of the image memory for storing the input image data. The frame memory 12 comprises a FIFO (First-In-First-Out) storage memory capable of performing the first-in-first-out function. 14 represents a filter for filtering the image data read out from the frame memory 12 to output the non-linearly magnified image data to an output terminal 16; 18, a coefficient memory for storing predetermined filter coefficients corresponding to a plurality of magnifications; 20, a non-linear magnification controller.

The coefficient memory 18 comprises a coefficient ROM 22, a memory controller 24, a selector 26 and a coefficient RAM 28.

The coefficient ROM 22 stores the predetermined filter coefficients corresponding to a plurality of magnifying powers.

The memory controller 24 outputs the coefficient writing address AD1, ROM address AD2 and R/W selection signal, which are predetermined according to the transfer start signal. The transfer signal means, for example, the signal generated when the power source is turned on, or the signal generated when altering the filtering characteristic.

The selector 26 selects the coefficient writing address AD1 for outputting it from the memory controller 24 when the R/W selection signal is a W selection signal (e.g., H-level signal), while selecting the coefficient selection address AD3 for output from the non-linear magnifying power controller 20.

The coefficient RAM 28 writes the filter coefficient read out from the coefficient ROM 22 according to the coefficient writing address AD1 selected by the selector 26 when the R/W selection signal is a W selection signal, and reads out the filter coefficient according to the coefficient selection address AD3 selected by the selector 26 when the R/W signal is an R selection signal.

For the coefficient selection address AD3, the detailed description will be given together with the description of the circuit shown in FIG. 2.

Figure 2:
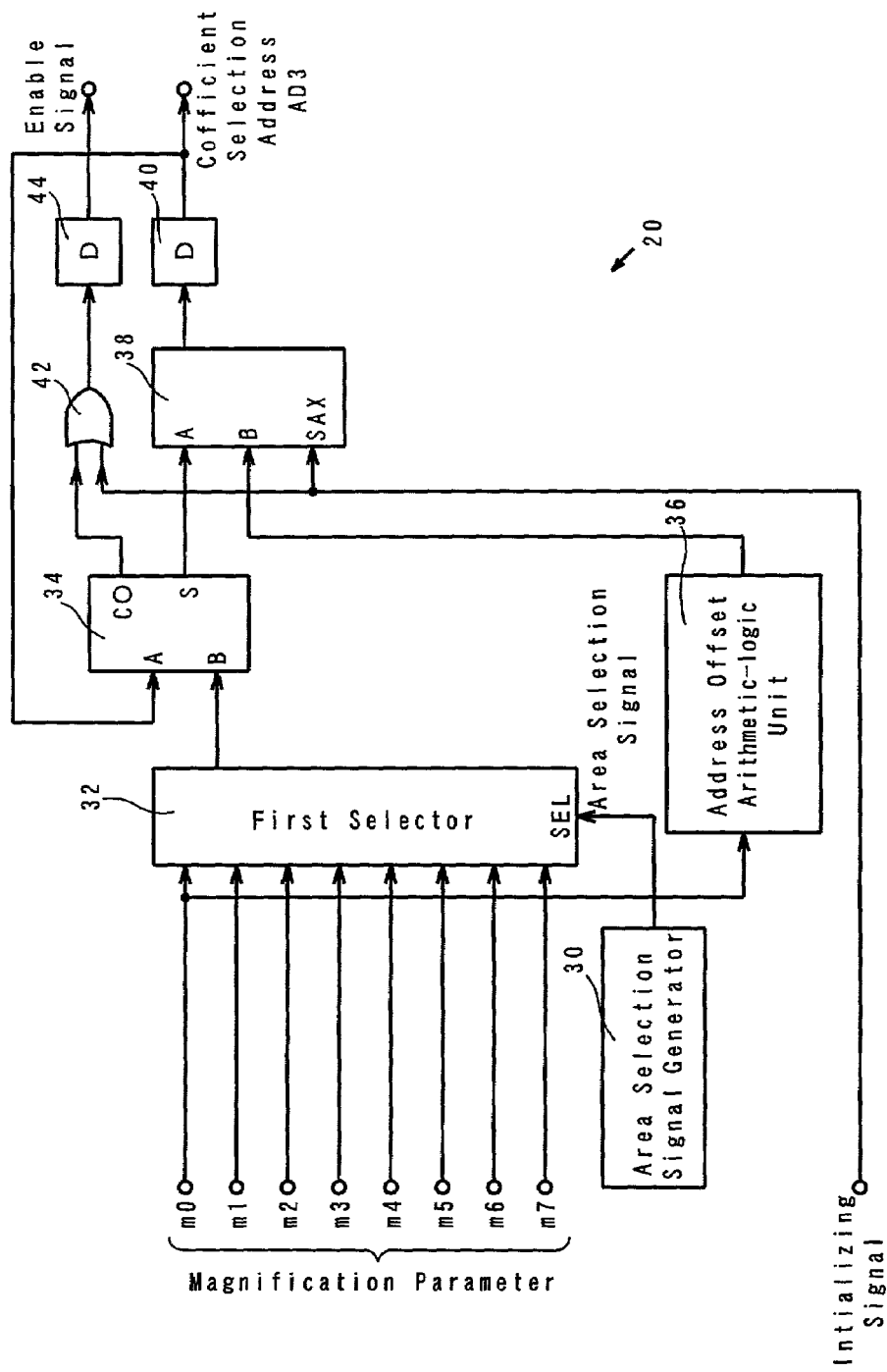
FIG. 2 is a block diagram showing a non-linear magnification controller 20 shown in FIG. 1.

The non-linear magnification controller 20 comprises, as shown in FIG. 2, an area selection signal generator 30, a first selector 32, an n-bit adder 34, an address offset arithmetic-logic unit 36, a second selector 38, a first delayer 40, a logical sum circuit 42 and a second delayer 44.

The area selection signal generator 30 generates the area selection signal for sequentially selecting 16 areas according to the previously set area width w.

The first selector 32 selects, for output, the magnification parameters m0 –m7 and m0 –m7 according to the area selection signal generated by the area selection signal generator 30.

Figure 3:
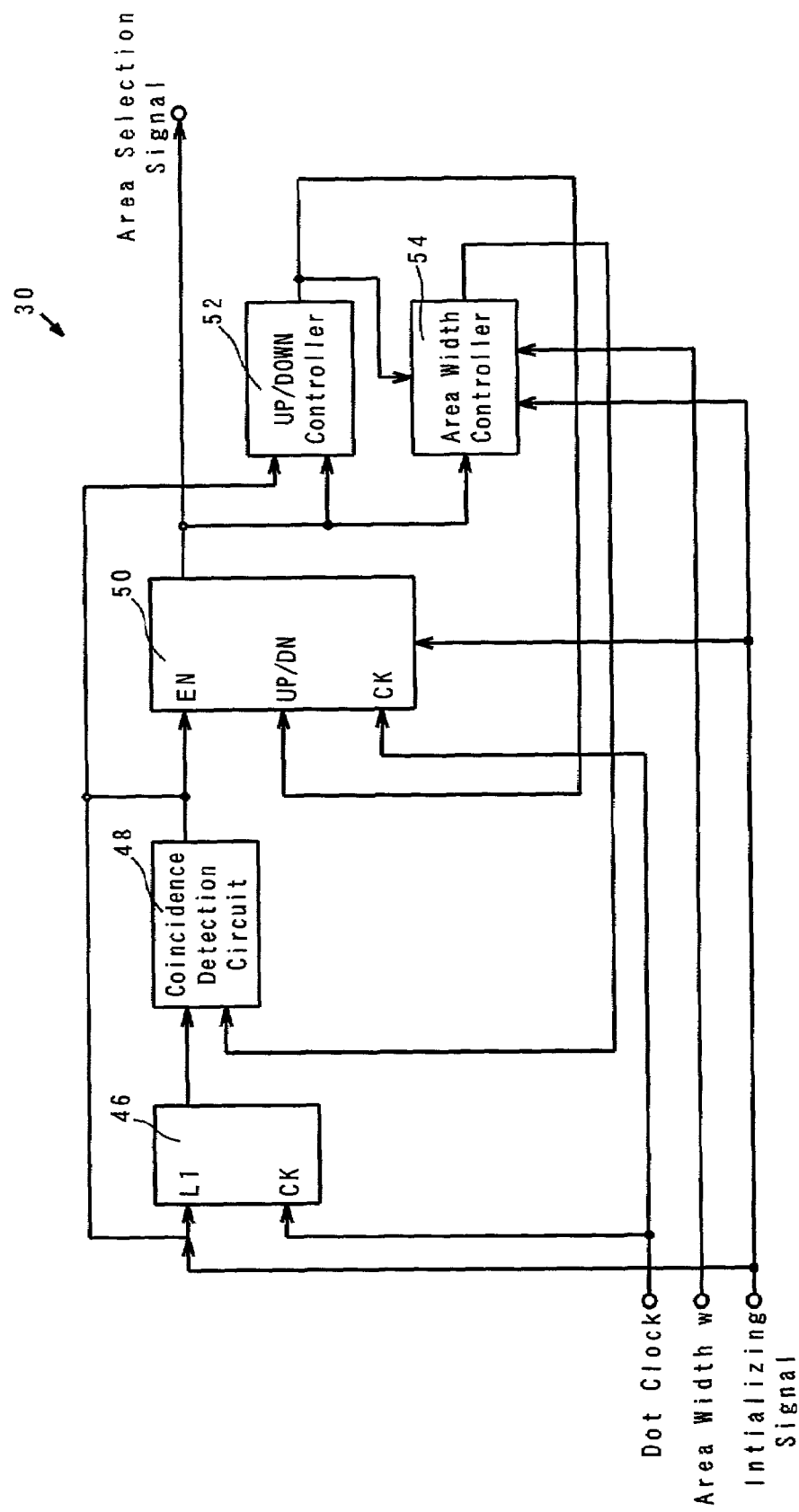
FIG. 3 is a block diagram showing an example of the area selection signal generator 30 shown in FIG. 2.

The area selection signal generator 30, as shown in FIG. 3, specifically comprises, a dot counter 46, a coincidence detection circuit 48, an up/down counter 50, an up/down controller 52 and the area width controller 54.

The dot counter 46 is provided with a load terminal L1 for loading the initializing signal as a counted value 1 and counts the dot clock inputted to the CK terminal.

The coincidence detection circuit 48 compares the counted value of the dot counter 46 and the comparison value (1 or 2 times the set area width w) to determine whether they coincide with each other.

The up/down counter 50 is reset by the initializing signal, counts the dot clock by using the signal detected by the coincidence detection circuit 48 as an enable signal and outputs the counted value K as an area selection signal.

When the counted value K of the up/down counter has become 0, the up/down controller 52 outputs the H-level signal to the up/down counter 50 to control the up/down counter 50 to the up-count mode and controls the up/down counter 50 to the down-count mode by changing the output to the up/down counter 50 to the L-level signal according to the signal detected by the coincidence detection circuit 48 after the counted value K of the up/down counter 50 has varied from the value corresponding to the area 6 of the picture to be displayed to the value corresponding to the area 7 thereof.

In the initial state, the area width controller 54 outputs the set area width, as a comparison value, to the coincidence detection circuit 48, outputs a value, equivalent to 2 times the set area width as a comparison value, to the coincidence detection circuit 48 when the counted value K of the up/down counter has changed from the value corresponding to the area 6 to one corresponding to the area 7 of the image to be displayed, and returns to the initial state when the output of the up/down controller 52 has changed from H-level to L-level.

The adder 34 gives the sum of an input B, which is one of the magnification parameters m (one of m0 –m7) and another input A, which is a coefficient selection address AD3 outputted from the first delay circuit 40.

The address offset arithmetic-logic unit 36 calculates the start point of the coefficient selection address AD3 according to the input of the magnification parameter m0, which has been set for the area 0, as being a selection start area, out of the 16 areas.

The second selector 38 selects and outputs the value calculated by the address offset arithmetic-logic unit according to the initializing signal, and selects and outputs the sum S given by the adder 34 when the initializing signal is absent.

The first delay circuit 40 delays the output of the second selector 38 by a single sampling period and not only gives a delayed output, as being a coefficient selection address AD3, to the selector 26 but also gives the same, as being another input A to the adder 34.

The logical sum circuit 42 outputs the logical sum signal between the carrying signal CO from the adder 34 and the initializing signal.

The second delay circuit 44 delays the output signal of the logical sum circuit 42 by a single sampling period and outputs the delayed signal, as an enable signal, to the frame memory 12 and the filter 14.

The operation of the address offset arithmetic-logic unit 36 is characterized by that all the bits are referred, starting from the lowest bit corresponding to m0 to the highest bit, not only for changing 0 of each bit to 1 until 1 can be encountered first but also for changing 1, encountered first, to 0 and changing all the rest of the bits to 0. For example, when m0=148 (magnification=256/148 ≈1.73) is expressed in terms of 8 bits, it becomes [10010100], and thus, when the operation according to the above-mentioned bit conversion is made to each bit, it becomes [00000011](=03h in terms of the hexadecimal digit, and this [00000011] (=03h) corresponds to the coefficient selection address AD3 of the area 0.

The filter 14 comprises a plurality of delay circuits D1–Dp (p: 2 or any integer larger than 2; not shown) for sequentially delaying the image data read out from the frame memory 12 by a single sampling period T (T= 1/Fs), an multiplier AO (not shown) for multiplying, for output, the image data read out from the frame memory 12 by a corresponding filter coefficient read out from the coefficient RAM 28, multipliers A1–Ap (not shown) for multiplying, for output, the image data outputted from a plurality of the delay circuits D1–Dp respectively by the corresponding filter coefficients read out from the coefficient RAM 28, and an adder (not shown) for adding the outputs of the multipliers A0–Ap for output to the output terminal 16.

Next, the functions of the embodiments shown in FIG. 1 through FIG. 3 will be explained referring FIG. 4 and FIG. 5.

A: First, the process through which the area selection signal is outputted from the area selection signal generator 30 shown in FIG. 2 will be explained referring to FIG. 3 and FIG. 4.

(1) In FIG. 3, the dot counter 46 loads a numeric value 1 according to the initializing signal to count the dot clock.

The coincidence detection circuit 48 compares the counted value of the dot counter 46 with the comparison value (equivalent to the set area width w in the initial state) outputted from the area width controller 54, and outputs a detection signal when both coincide with each other. The set area width (e.g., 120) is one sixteenth of the number of the effective dots of one horizontal line (e.g., 1920).

(2) The up/down counter 50 is reset by the initializing signal, counts the dot clock by using the detection signal of the coincidence detection circuit 48 as an enable signal, and outputs the counted value as an area selection signal.

The up/down controller 52 changes the output to the up/down counter 50 from the L-level signal to H-level signal when the counted value K of the up/down counter 50 is 0 (initialized state) to control the up/down counter 50 to the up-count mode, while changing the output to the up/down counter 50 from the H-level signal to the L-level signal according to the first detection signal of the coincidence detection circuit 48 to control the up/down counter 50 to the down-count mode, after the counted value K of the up/down counter 50 has changed from 6 (corresponding to the area 6) to 7 (corresponding to the area 7). The area width controller 54 outputs, as a comparison value, the set area width to the coincidence detection circuit 48 in the initial state outputs a comparison value, equivalent to 2 times the set area width, to the coincidence detection circuit 48 when the counted value K of the up/down counter 50 has changed from 6 to 7, and returns to its initial state when the output of the up/down controller 52 has changed from H-level to L-level.

(3) Therefore, the counted value 0 (K=0) of the up/down counter 50 is outputted until the counted value of the dot counter 46 reaches the set area width w (e.g., 120); since, each time the counted value of the dot counter 46 reaches the set area width w, the coincidence detection circuit 48 outputs a detection signal to add 1 to the counted value of the up/down counter 50, the counted value K of the up/down counter varies from 0 to 7 with respect to the areas 0 through 7 of the image to be displayed.

Then, when the counted value K of the up/down counter 50 has varied from 6 to 7, the comparison value to the coincidence detection circuit 48 becomes 2 times the set area width w; since not only the mode of the up/down counter 50 changes to the down-count mode responding to the output of the first detection signal (at the timing when K varies from 7 to 8) but also the comparison value to the coincidence detection circuit 48 returns to the set area width w in the initial state, the counted value K of the up/down counter 50 varies from 7 to 0 with respect to the areas 8 through 15 of the image to be displayed.

B: Next, the process through which the coefficient selection address AD3 and the enable signal are outputted from the non-linear magnification controller 20 shown in FIG. 1, referring to FIG. 2 and FIG. 5.

(1) In FIG. 2, the first selector 32 selects, for output, the magnification parameters m0 –m7 and m0 –m7 set for 16 areas 0–7 and 8–15 according to the area selection signal generated by the area selection signal generator 30.

Figure 5:
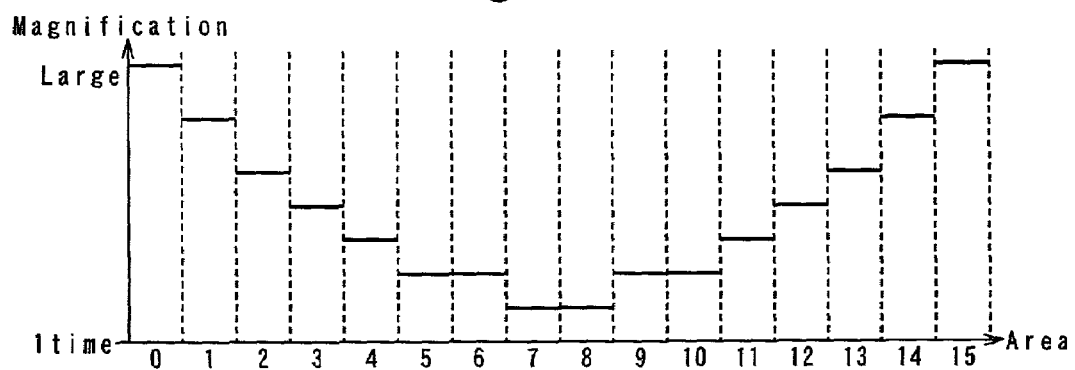
FIG. 5 is a diagram showing the relationship between the area and the magnification, wherein, when applied in the case of FIG. 4, in order to obtain a panoramic-view picture, the values of the magnification parameter m for the central areas 7 and 8 are set to the largest value m7, i.e., the smallest value in terms of magnification (=256/m7), while the magnification parameters for the rest of the areas are set to decrease gradually towards the leftmost and the rightmost areas from the central area so that the values of the magnification parameters for the leftmost area 0 and the rightmost area 15 become the smallest value m0, i.e., m the largest value (=256/m0) in terms of the magnification.

In order to obtain a panoramic-view image, as shown in FIG. 5, the magnification parameter m7 for the central areas 7 and 8 is set to the largest value, e.g., m7=237 (magnification=256/m7 ≈1.08) of all, which are distributed symmetrically with respect to the central areas but to decrease gradually, e.g., m0=148 (magnification=256/m0 ≈1.73) towards the leftmost and rightmost areas.

(2) The address offset arithmetic-logic unit 36 refers the bits from the lowest bit of the magnification parameter m0 towards the highest bit, varies 0 of each bit to 1 until 1 is encountered first, varies the 1, which is encountered first, to 0, and varies all the rest of the bits to 0. Therefore, when m0=148 (magnification=256/148≈1.73), 8-bit expression becomes [1010100], so that the operation according to the previously described bit conversion is carried out to output [00000011] (=03h in terms of hexadecimal expression).

(3) The second selector 38 selects, for output, the calculated value 03h of the address offset arithmetic-logic unit 36 according to the initializing signal; the calculated value 03h is delayed by 1 dot clock (1 sampling period) in the first delay circuit 40 to become an A input to the adder 34, while 94h (hexadecimal expression of m0=148) becomes a B input to the adder 34, so that the adder 34 outputs 97h as the output of the sum S.

Then, when the initializing signal is absent (e.g., change of signal level from H-level to L-level), the second selector 38 selects 97h for output of the sum S of the adder 34.

The 97h (the output the sum S) is not only outputted as a coefficient selection address AD3 at the timing of the second dot clock following the absence of the initializing signal but also becomes an A input to the adder 34, so that, at the timing of the third dot clock, Abh (97h+94h) is not only outputted as a coefficient selection address AD3 but also becomes an A input to the adder 34.

Likewise, at the timing of the fourth dot clock, 3Fh (Abh+94h) is not only outputted as a coefficient selection address AD3 but also becomes an A input to the adder 34. At the timing of the fourth dot clock, an H level signal appears at the CO terminal of the adder 34 and is outputted as an enable signal after being delayed by 1 dot clock in the second delay circuit 44.

(4) Therefore, while the first selector selects and outputs the magnification parameter m0, the coefficient selection address AD3, to be outputted from the second selector 38 through the first delay circuit 40, varies in the order of 03h, 97h, Abh, 3Fh, . . . according to the dot clock and is then inputted, as a read-out address, to the coefficient RAM 28 through the selector 26 of the coefficient memory 18. Each time the H-level signal appears at the CO terminal of the adder 34, the enable signal, delayed by 1 dot clock, is inputted to the frame memory 12 and the filter 14.

Similarly, when the first selector 32 selects, for output, the magnification parameters m1–m7 set for the areas 1–7, the coefficient selection address AD3, varying according to the dot clock and corresponding to each magnification parameter, is inputted, as a read-out address, to the coefficient RAM 28, while, each time the H-level signal appears at the CO terminal of the adder 34, an enable signal, delayed by 1 dot clock, is inputted to the frame memory 12 and the filter 14.

Further, a process similar to the above will be followed when the first selector selects, for output, the magnification parameters m7 –m0 set for the areas 8–15.

C: Next, the functions of the frame memory 12 and the filter 14 shown in FIG. 1 and the image to be displayed will be explained referring to FIG. 5.

(1) The frame memory 12 stores the image data for 1 frame, which has been sampled by the sampling frequency Fs and inputted to the input terminal 10.

Then, when reading out the image data from the frame memory 12, whether the image data is updated or held is determined according to the enable signal, which is read out from the non-linear magnification controller 20, and the read-out image data is inputted to the filter 14. In other words, when the enable signal outputted from the non-linear magnification controller 20 is a H-level signal, the image data corresponding to 1 new picture element for each 1 dot clock is read out to be inputted to the filter 14, while, when the enable signal outputted from the non-linear magnification controller 20 is an L-level signal, the image data, which has been read out immediately before the enable signal, is held to be inputted to the filter 14.

(2) The corresponding filter coefficient is read out from the coefficient RAM 28 of the coefficient memory 18 according to the coefficient selection address AD3 outputted from the non-linear magnification controller 20, and inputted to the multipliers A0–A$p$ included in the filter 14.

Further, the enable signal, outputted from the non-linear magnification controller 20, is inputted, as a signal for timing control (e.g., coincidence of timing), to the EN terminals of the delay circuits D1–D$p$ included in the filter 14.

(3) Therefore, the filter 14 filters the image data read out from the frame memory 12 according to the filter coefficient read out from the coefficient RAM 28 of the coefficient memory 18, and outputs the non-linearly magnified image data to the output terminal 16.

For instance, when the coefficient selection address AD3, outputted from the non-linear magnification controller 20, corresponds to the area 0 (magnification parameter m0) (03h, 97h, Abh, 3Fh, . . . ), the corresponding filter coefficient for each address, is inputted to a plurality of multipliers A0-A$p$ to be multiplied by the corresponding image data, and added by the adder to be outputted to the output terminal 16.

Similarly, when the coefficient selection address AD3, outputted from the non-linear magnification controller 20, corresponds to the area 1 (magnification parameter m1), the corresponding filter coefficient for each address is inputted to a plurality of multipliers A0-A$p$ to be multiplied by the corresponding image data, and are added by the adder to be outputted to the output terminal 16.

The same is true, when the coefficient selection address AD3, outputted from the non-linear magnification controller 20, corresponds to the areas 2–7 (magnification parameters m1–m7) or the areas 8–15 (magnification parameters m0–m7).

(4) When the image data, outputted to the output terminal 16, is provided to a display panel such as a PDP, such a panel displays an image like a panoramic photo.

Figure 4:
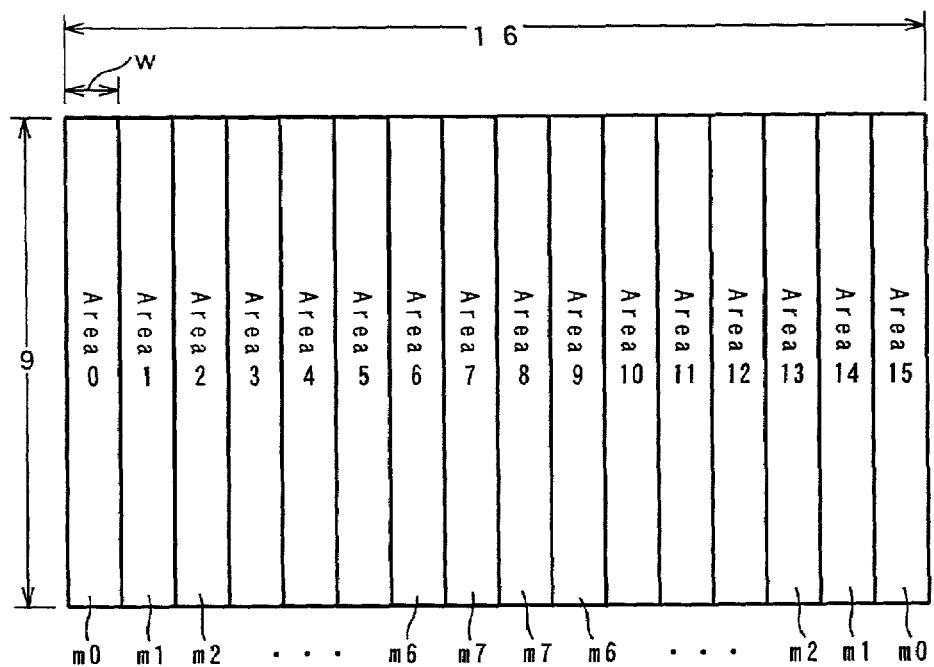
FIG. 4 is an explanatory diagram showing a case where the picture to be displayed having an aspect ratio of 16:9 is divided into 16 equal areas with an equal set area width w, and the values of the magnification parameter m are equally set to m 7 for the central areas 7 and 8, while the magnification parameters for the rest of the areas, i.e., areas 0–16 and 15 –9 are set symmetrically towards the leftmost and the rightmost areas with respect to the central area.

In other words, a full-mode panoramic-photo-like image can be displayed on a wide display screen as shown in FIG. 4, where a wide display screen having an aspect ratio of 16:9 is divided into 16 equal areas of an area width w; the magnification parameters for the central areas 7 and 8 of the display screen are set equal but to the largest value (m7=237) while the magnification are set to the smallest value (the magnification: 256/237 ≈1.08); the magnification parameters for the rest of the areas are distributed symmetrically with respect to the central areas so as to decrease gradually towards the leftmost and rightmost areas of the display screen; the magnification parameter values for the leftmost and the right most areas are set equal but to the smallest values (m0=148) while the magnification is set to the largest value (magnification=256/148 ≈1.73).

The above embodiment, when designed for the display of a panoramic- photo-like image, is characterized by the display screen being divided into 16 equal areas of a width w, whereby the magnification parameters m are not only distributed symmetrically with respect to the central areas of the display screen but also distributed to decrease gradually towards the leftmost and rightmost areas not only to decrease the capacity of the memory required for the coefficient memory but also to simplify the composition of the selector of the non-linear magnification controller, but the present invention is not necessarily limited to such an embodiment and is applicable to the case where the display screen is divided into n number of areas of a width w; the magnification parameters for the divided area are set at any values for realizing the image having various effects.

Figure 6:
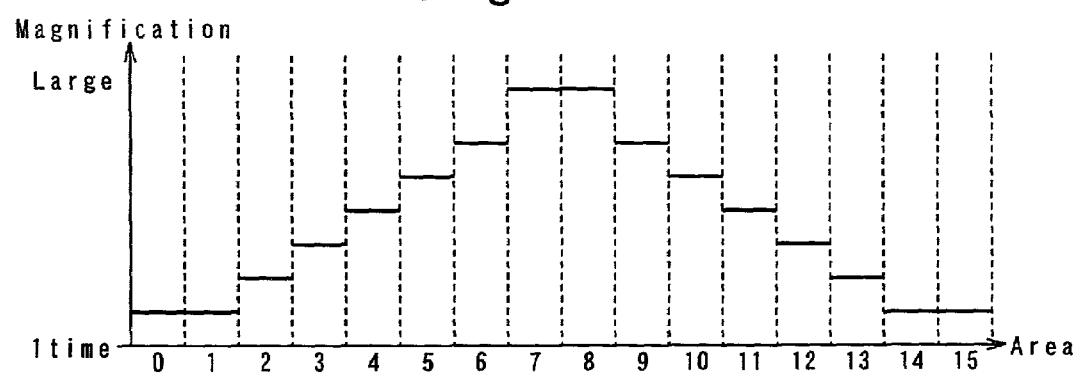
FIG. 6 is a diagram showing the relationship between the area and the magnification, wherein, when applied in the case of FIG. 4, in order to obtain a fisheye-view picture, the values of the magnification parameters m for the central areas 7 and 8 are set to the smallest value m7, i.e., the largest value in terms of the magnification (=256/m7), while the magnification parameters for the rest of the areas are set to increase gradually towards the leftmost and the rightmost areas from the central areas so that the values of the magnification parameters for the leftmost area 0 and the rightmost area 15 become the largest value m0, i.e., the smallest value in terms of the magnification (=256/m0).

For instance, as shown in FIG. 6, the present invention is applicable to the case where the display screen is divided into 16 equal areas so that the magnification parameters are distributed not only symmetrically with respect to the central areas but also to decrease gradually towards the leftmost and the rightmost areas. In other words, a full-mode image similar to one obtainable through a fisheye lens can be displayed on a screen where the magnification parameters m for the central areas 7 and 8 of the display screen are set equal but to the smallest value, i.e., m7=152, while the magnification is set to the largest value, i.e., magnification=256/m7 ≈1.68; the magnification parameters m are distributed symmetrically with respect to the central areas and to decrease gradually towards the leftmost and rightmost areas in a fashion that the magnification parameters m for the leftmost area 0 and the rightmost area 15 are set equal but to the largest values, i.e., m0=235, while the magnification is set to the smallest value, i.e., magnification=256/m0 ≈1.09.

In the above embodiment, for the simplification of the composition, the area selection signal generator is made to comprise a dot counter, an incidence detection circuit, an up/down counter, an up/down controller and an area width controller, but the present invention is not limited to this composition and is applicable where there is available any area selection signal generator capable of generating an area selection signal designed for sequentially selecting n number of areas each having a width w.

In the above embodiment, for the simplification of the composition, the non-linear magnification controller is made to comprise an area selection signal generator, a first selector, an n-bit adder, an address offset arithmetic-logic unit, a second selector, a first delay circuit, a logical sum circuit and a second delay circuit, but the present invention is not limited to this composition and is applicable where there is available any non-linear magnification controller not only capable of outputting an enable signal for reading out corresponding image data from the image memory according to the magnifications set for n number of areas, each having a width w, provided by dividing a display screen into n number of equal areas, but also capable of outputting the coefficient selection address for reading out the corresponding filter coefficient from the coefficient memory.

In the above embodiment, for easy alteration of the magnification for each of the areas obtained by dividing a display screen into n number of equal areas of a width w, the coefficient memory is made to comprise a coefficient ROM, a memory controller, a selector and a coefficient RAM, but the present invention is not limited to this composition and is applicable where the coefficient memory is capable of storing predetermined filter coefficients corresponding to a plurality of magnifications.

INDUSTRIAL APPLICABILITY

As discussed in the foregoing, the image magnifying circuit according to the present invention can be used for enlarging a normal-size picture having the aspect ratio of 4:3 to a picture having the aspect ratio of 16:9 to be displayed on a wide-size picture display screen. In such a case, since it is possible to horizontally enlarge each of the areas provided by dividing the image to be displayed into n number of equal areas at any desired magnification, a variety of effects can be produced for the image. For instance, not only magnification of the n number of equally divided image can be increased gradually towards both the marginal areas to obtain a panoramic-view image but also the magnification of the number of equally divided image can be decreased gradually towards both the marginal areas to obtain a view available through a fisheye lens.

What is claimed is:

1. An image magnifying circuit for horizontally enlarging image data inputted by sampling for a horizontally enlarged display of an image, said circuit comprising an image memory for storing inputted image data, a coefficient memory for storing predetermined filter coefficients corresponding to a plurality of magnifications, a non-linear magnification controller for outputting an enable signal to read out corresponding image data from the image memory according to any given magnification set for n number of equal areas, each area having a width w provided by dividing the image to be displayed by n, n being an integer of at least 2, and outputting a coefficient selection address to read out a corresponding filter coefficient from the coefficient memory and a filter for filtering the image data read out from the image memory according to the filtering coefficient read out from the coefficient memory and outputting image data processed for enlargement according to any magnification set for each of the n number of areas arranged horizontally, wherein the coefficient memory comprises a Read Only Memory for storing the predetermined filter coefficients, a memory controller for reading out the filter coefficients from the Read Only Memory according to a transfer start signal and outputting a coefficient writing address and a Read/Write selection signal, a selector selecting either of the coefficient selection address outputted from the non-linear magnification controller or the coefficient writing address outputted from the memory controller, and a coefficient Random Access Memory for storing the coefficient writing address read out from the coefficient Read Only Memory according to the coefficient writing address outputted from the selector when the Read/Write selection signal is a Write selection signal and reading out the filter coefficient according to the coefficient selection signal outputted from the selector when the Read/Write selection signal is a Read selection signal.

2. An image magnifying circuit for horizontally enlarging image data inputted by sampling for a horizontally enlarged display of an image, said circuit comprising an image memory for storing inputted image data, a coefficient memory for storing predetermined filter coefficients corresponding to a plurality of magnifications, a non-linear magnification controller for outputting an enable signal to read out corresponding image data from the image memory according to any given magnification set for n number of equal areas, each area having a width w provided by dividing the image by n, n being an integer of at least 2, and outputting a coefficient selection address to read out a corresponding filter coefficient from the coefficient memory and a filter for filtering the image data read out from the image memory according to the filtering coefficient read out from the coefficient memory and outputting image data processed for enlargement according to any magnification set for each of the n number of areas arranged horizontally, wherein the non-linear magnification controller comprises an area selection signal generator for generating an area selection signal for sequentially selecting n number of areas, each having the width w, a first selector for selecting for output a magnification parameter m set for a corresponding area according to the area selection signal generated by the area selection signal generator, m being a positive number no greater than $n^2$ and the magnification being equivalent to $n^2/m$, an n-bit adder for receiving, as an input, the magnification parameter m selected by the first selector, an address offset arithmetic-logic unit for calculating the start point of the coefficient selection address according to the input of the magnification parameter m set for the selection start area of the n number of areas, a second selector selecting for output the calculated value of the address offset arithmetic-logic unit and the sum-data of the adder, a first delayer for delaying the output value of the second selector by one sampling period for output as a coefficient selection address and another input to the adder, a logical sum circuit for outputting a logical sum signal of a carry signal of the adder and an initializing signal, and a second delayer for delaying the output signal of the logical sum circuit by one sampling period for output as an enable signal to the image memory.

3. The image magnifying circuit defined in claim 2, wherein the area selection signal generator comprises a dot counter for counting a dot clock, the dot counter being provided with a load terminal L1 for loading the initial signal as a counted value 1, a coincidence detection circuit for comparing the counted value of the dot counter with the set area width w or 2 times the set area width w to detect whether they coincide with each other and outputting the detection signal, as a counted value 1, to the load terminal L1 of the dot counter, an up/down counter, which can be reset by the initializing signal, for counting the dot clock according to the enable signal, which is the detection signal of the coincidence circuit, and outputting the counted value as the area selection signal, an up/down controller for controlling the up/down counter to the up-count mode by outputting an H-level signal when the counted value of the up/down counter has become 0 and controlling the up/down counter to the down-count mode according to the detection signal of the coincidence detection circuit after a counted value K of the up/down counter has varied to the value corresponding to the central areas of the image to be displayed and an area width controller for outputting the set area width w, as a comparison value, to the coincidence detection circuit in the initial state and outputting 2 times the set area width w, as a comparison value, to the coincidence detection circuit when the counted value K of the up/down counter has varied to the value corresponding to the central areas of the image to be displayed.

4. The image magnifying circuit defined in claim 2, wherein the magnification parameters m set for the n number of areas are distributed symmetrically with respect to the central areas of the image to be displayed.

5. The image magnifying circuit defined in claim 4, wherein the magnification parameters m set for the n number of areas are set to decrease gradually towards the leftmost and rightmost areas from the central areas.

6. The image magnifying circuit defined in claim 4, wherein the magnification parameters m set for the n number of areas are set to increase gradually towards the leftmost and rightmost areas from the central areas.

* * * * *